(No Model.)
F. ROSENBERG.
EAR PIERCER.
No. 262,833. Patented Aug. 15, 1882.
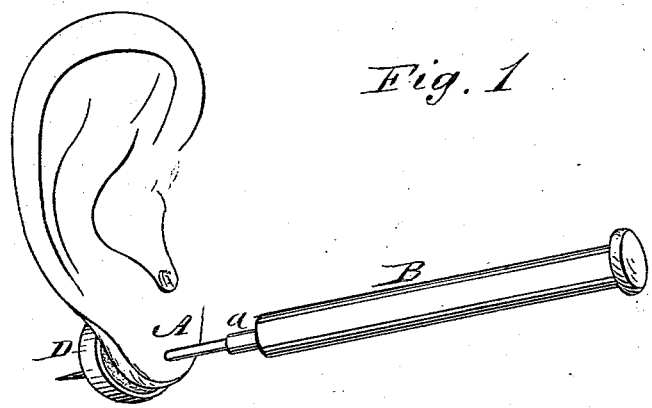
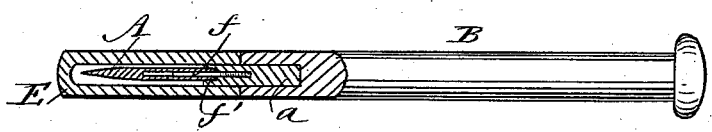
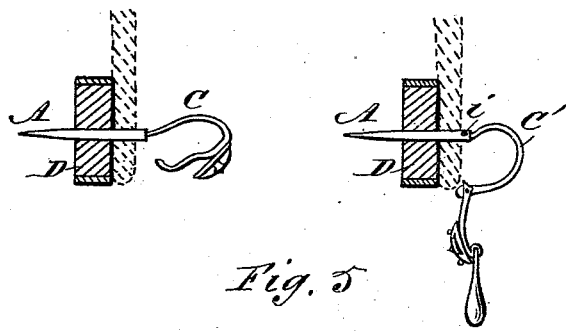
WITNESSES:
C. Neveux
C. Sedgwick
INVENTOR:
F. Rosenberg
BY Munn & Co.
ATTORNEYS.

UNITED STATES PATENT OFFICE.

FREDERICK ROSENBERG, OF NEW YORK, N. Y.

EAR-PIERCER.

SPECIFICATION forming part of Letters Patent No. 262,833, dated August 15, 1882.

Application filed February 16, 1882. (No model.)

*To all whom it may concern:*

Be it known that I, FREDERICK ROSENBERG, of the city, county, and State of New York, have invented a new and Improved Ear-Piercing Implement, of which the following is a full, clear, and exact description.

The object of my invention is to provide an ear-piercing implement having such construction that the puncturing of the lobe of the ear and the insertion of the hook of the ear-ring may be done at a continuous operation, thus avoiding the necessity of withdrawing the needle or piercing-point and subsequently inserting the hook, as is now the practice.

My invention also consists of the construction, arrangement, and combination of the parts of the implement, all as hereinafter fully described.

Reference is to be had to the accompanying drawings, forming part of this specification, in which similar letters of reference indicate corresponding parts in all the figures.

Figure 1 is a perspective view illustrating the manner of using my new and improved ear-piercing implement. Fig. 2 is a partial sectional elevation of the implement. Figs. 3 and 4 are sectional elevations, showing the method of passing the point and hooks of the ear-ring through the lobe of the ear after the handle has been removed from or taken away from the point; and Fig. 5 is a plan view of a modified form of point.

A represents the piercing-point, which may be made of gold or silver. B represents the handle; C C′, the hooks of the ear-rings; and D represents the cork pad to be placed behind the lobe of the ear to support the same while being pierced, as indicated in Figs. 1, 3, and 4.

The point A is made hollow at its blunt end for a short distance, as shown in Fig. 2, and in most instances it will be perforated near its blunt end with the small hole $i$ for inserting what is known as the "German" ear-ring hook C′, as shown in Fig. 4. For inserting the ordinary hook, C, the point need not be formed with the perforation $i$, and in some cases, instead of making the point a plain hollow point, as shown in Figs. 3 and 4, the point will be formed with the slot $e$, as shown in Fig. 5, which divides the point so as to form small springs or clamp-plates for clasping the spindle $f$ of the handle B for holding the point with considerable firmness upon the said spindle.

The spindle $f$ of the handle is fixed in the metal shank $a$, which is set in the end of the handle, as shown in Fig. 2. This shank is chambered out at its outer end, as shown at $f'$, to receive the blunt end of the point A and to act as a support and as a stop to limit the distance of insertion of the point through the lobe of the ear.

In use the point is placed upon the spindle $f$, with its blunt end pushed as far as possible into the recess $f'$. The pad D is then placed behind the ear, and the point is passed through the lobe of the ear and through the pad until the end of the shank $a$ comes against the ear. The handle is then moved from the point, leaving the blunt end of the point protruding a short distance from the ear, as indicated in full and dotted lines in Figs. 3 and 4. If the ring to be inserted has an ordinary hook, like that indicated at C, Fig. 3, the point of the hook is then placed into the hollow blunt end of the point, and the point and hook are then carried together through the lobe of the ear. If the ring to be inserted is a German ring, like that shown at C′, Fig. 4, the upturned point of the hook is placed in the perforation $i$, as indicated in Fig. 4, and the point and hook are then passed in like manner together through the lobe of the ear.

By this means it will be seen that the piercing of the ear and the insertion of the hook may be quickly done, and that it can be done with less pain than by the old method.

E represents a cover, which is adapted to fit upon the shank $a$ and to inclose the point A and the other parts of the implement, as indicated in Fig. 2.

Having thus fully described my invention, I claim as new and desire to secure by Letters Patent—

1. A handle-shank, $a$, having a recessed spindle, $f'$ $f$, made fast thereto, in combination with the point A, whereby the shank is made to support the point and gage the distance to which it shall go in piercing, as described.

2. The hollow ear-piercing point A, formed with the perforation $i$, as and for the purposes set forth.

3. The implement, made substantially as herein shown and described, consisting of the hollow point A, having perforation $i$, handle B, and cover E, the handle being provided with the shank $a$ and spindle $f$, substantially as described.

FREDERICK ROSENBERG.

Witnesses:
   H. A. WEST,
   C. SEDGWICK.